(12) United States Patent
Cheung et al.

(10) Patent No.: US 8,146,786 B2
(45) Date of Patent: Apr. 3, 2012

(54) CARGO BED EXTENDER

(75) Inventors: Danny Cheung, Raymond, OH (US); Christopher Salvador, Raymond, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 1044 days.

(21) Appl. No.: 11/778,110

(22) Filed: Jul. 16, 2007

(65) Prior Publication Data

US 2009/0021035 A1    Jan. 22, 2009

(51) Int. Cl.
*B60R 9/00* (2006.01)

(52) U.S. Cl. ........ 224/403; 224/402; 224/404; 224/495; 224/497; 296/26.11

(58) Field of Classification Search .................. 224/403, 224/495, 497, 498, 404, 402, 405; 296/26.11, 296/37.5, 37.6, 26.06, 26.01; 414/462, 557
See application file for complete search history.

(56) References Cited

U.S. PATENT DOCUMENTS

| | | | |
|---|---|---|---|
| 3,913,811 A | 10/1975 | Spencer | |
| 4,778,213 A | 10/1988 | Palmer | |
| 4,934,572 A * | 6/1990 | Bowman et al. | 224/558 |
| 5,169,042 A | 12/1992 | Ching | |
| 5,435,472 A | 7/1995 | Allen et al. | |
| 5,468,038 A | 11/1995 | Sauri | |
| 5,658,033 A * | 8/1997 | Delaune | 296/26.08 |
| 5,732,996 A * | 3/1998 | Graffy et al. | 296/62 |
| 5,755,480 A | 5/1998 | Bryan | |
| 5,765,892 A * | 6/1998 | Covington | 296/26.03 |
| 5,788,311 A * | 8/1998 | Tibbals | 296/62 |
| 5,918,925 A | 7/1999 | Perrin | |
| 5,971,241 A * | 10/1999 | Allen et al. | 224/497 |
| 6,082,801 A | 7/2000 | Owen et al. | |
| 6,120,076 A * | 9/2000 | Adsit et al. | 296/26.11 |
| 6,340,190 B1 | 1/2002 | Rosebrugh et al. | |
| 6,378,926 B1 * | 4/2002 | Renze et al. | 296/26.11 |
| 6,422,627 B1 * | 7/2002 | Kuhn et al. | 296/26.1 |
| 6,550,841 B1 * | 4/2003 | Burdon et al. | 296/57.1 |
| 6,631,938 B1 * | 10/2003 | Burns | 296/64 |
| 6,676,182 B2 * | 1/2004 | Fitts | 296/26.11 |
| 2005/0006921 A1 * | 1/2005 | Chumley et al. | 296/75 |

* cited by examiner

*Primary Examiner* — Justin Larson
*Assistant Examiner* — Steven M Landolfi, Jr.
(74) *Attorney, Agent, or Firm* — Jason H. Foster; Kremblas & Foster

(57) ABSTRACT

The invention is an apparatus for use with a vehicle having a tailgate. The apparatus has a frame hingedly mounted to an exterior of the tailgate with at least about 270° of rotation relative to the tailgate. The apparatus has first and second arms pivotably mounted on opposite sides of the frame with at least about 90° of rotation relative to the frame from a resting position, in which the arms are substantially parallel to the frame, to an extended position. First and second panels mount between the arms when the arms are extended, wherein the first panel is mounted to ends of the arms that are opposite the frame and the second panel is mounted to an underside of each of the arms.

11 Claims, 4 Drawing Sheets

US 8,146,786 B2

CARGO BED EXTENDER

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to a cargo bed extender, and more specifically to a multi-functional bed extender system.

2. Description of the Related Art

In a vehicle with an open cargo bed there is sometimes a need for extra space. For example, when hauling lumber or materials that extend past the open cargo bed area, added space is needed to enclose all of the materials within the cargo bed. When more open cargo bed space is needed, a user typically mounts a cargo bed extender near the interior surface of the tailgate of the cargo bed.

To use the cargo bed extender, the user opens the tailgate and extends the cargo bed extender in a direction away from the interior surface of the cargo bed area. The materials, such as lumber, are placed in the cargo bed and the extender restrains the materials that hang over the end of the tailgate. The cargo bed extender holds the materials in place during transit, which provides a safer system of travel for the user, because the materials could otherwise fall out during transport.

Once the lumber or other cargo is removed, the cargo bed extender is folded inward and stored in the open cargo bed area. Because of the size of conventional bed extenders, the space of the cargo bed is significantly reduced during storage. This is a problem for truck owners who often haul materials that do not require the use of the cargo bed extender, and who require the full use of the cargo bed.

Further, typical cargo bed extenders have the single purpose of increasing the effective volume of the cargo bed; there are no provisions for changing the cargo bed extender to function in other ways. Therefore, there is a need for a method and apparatus that has multiple functions and can be stored without encroaching on the open cargo bed area of the vehicle.

BRIEF SUMMARY OF THE INVENTION

The invention is an apparatus for use with a vehicle having a tailgate. The apparatus has a frame hingedly mounted to an exterior of the tailgate with at least about 270° of rotation relative to the tailgate. The apparatus has first and second arms pivotably mounted on opposite sides of the frame with at least about 90° of rotation relative to the frame from a resting position, in which the arms are substantially parallel to the frame, to an extended position. First and second panels mount between the arms when the arms are extended, the first panel being mounted to ends of the arms that are opposite the frame and the second panel being mounted to an underside of each of the arms. The invention can be converted easily from a cargo bed extender to a bicycle rack or a basket external to the cargo bed.

Figure 1A:
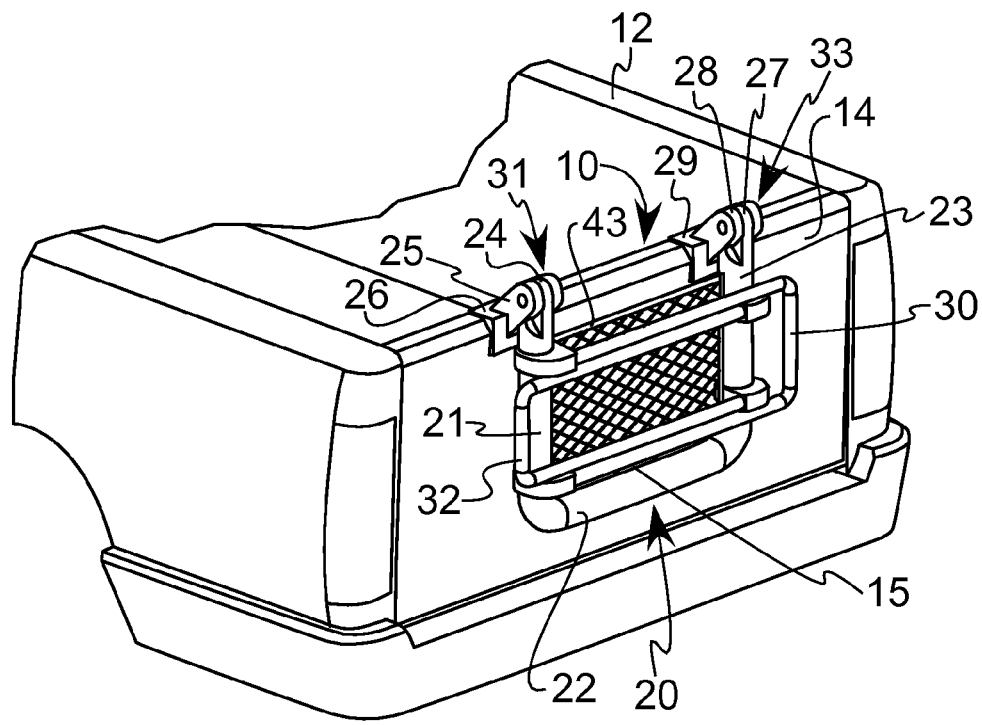
FIG. 1A is a view in perspective illustrating the preferred embodiment of the present invention.

In describing the preferred embodiment of the invention, which is illustrated in the drawings, specific terminology will be resorted to for the sake of clarity. However, it is not intended that the invention is limited to the specific term so selected and it is to be understood that each specific term includes all technical equivalents, which operate in a similar manner to accomplish a similar purpose. For example, the word connected or term similar thereto is often used. They are not limited to direct connection, but include connection through other elements where such connection is recognized as being equivalent by those skilled in the art.

DETAILED DESCRIPTION OF THE INVENTION

The preferred embodiment of the present invention is illustrated in FIGS. 1-6. The method for using the apparatus 10 begins by a user mounting a frame 20 to the exterior of the tailgate 14 of the vehicle 12. From this resting position, illustrated in FIG. 1, the apparatus 10 can be configured in a variety of ways as illustrated in FIGS. 2-5, and as described after an introduction to the structural components of the apparatus.

As illustrated in FIG. 1A, the frame 20 has three sides 21, 22, and 23 and is hingedly mounted to an exterior of the tailgate 14 with at least about 270° of rotation relative to the tailgate 14. A first arm 30 is pivotably mounted on one side 21 of the frame and a second arm 32 is pivotably mounted on the opposite side 23 of the frame 20. Each of the arms 30 and 32 has at least about 90° of rotation relative to the frame 20 from a resting position, in which the arms 30 and 32 are substantially parallel to the frame 20, illustrated in FIG. 1A, to an extended position, illustrated in FIG. 2.

In the preferred embodiment, the frame 20 is U-shaped and made of tubular aluminum. Preferably, the frame 20 is formed as a single continuous tube, but the frame 20 can be made of separate parts that are integrally connected. As will be recognized by a person having ordinary skill, the frame 20 can be any variety of similar shapes, such as a solid four-sided plate. In addition, the frame can be made of a variety of materials, for example, wood, steel, plastic or other strong, weather-resistant materials.

The arms 30 and 32 of the preferred embodiment are also U-shaped and made of tubular aluminum. However, the arms 30 and 32 can be made of a variety of materials and take on a variety of shapes. For example, the arms can be a solid panel or any number of tubular structures, including a single tube. A person of ordinary skill will recognize that there are a variety of ways to construct the frame and the arms to accomplish the purpose of the invention. The above are only a few examples.

Figure 1B:
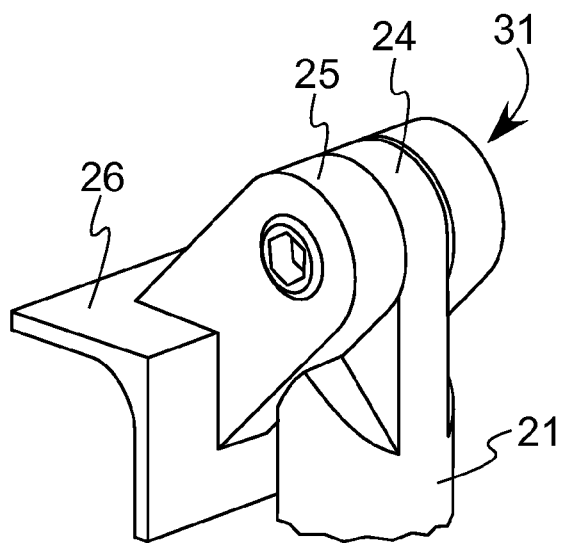
FIG. 1B is an exploded view illustrating an embodiment of FIG. 1A.

As illustrated in FIGS. 1A and 1B, the frame sides 21 and 23 each terminate in hinge spines 24 and 27, each of which is one of the components of the hinges 31 and 33. The hinge spines 24 and 27 are pivotably mounted in hinge grooves 25 and 28 that are formed in the mount plates 26 and 29, respectively. The frame 21 can pivot about the hinges 31 and 33 during use. The hinge spines 24 and 27 are preferably pivotably mounted in the grooves 25 and 28 with a conventional screw that extends through aligned apertures in each. The shanks of the screws are smaller in diameter than the diameters of the openings in the spines so that the spine, and attached frame, pivot freely until the screws are tightened, at which time there is no relative movement. Any mounting devices can be used so long as a pivotable hinge is formed.

The mount plates 26 and 29 can be mounted to the top exterior of the tailgate 14 using conventional fasteners such as screws, glue, or any variety of securing methods. A person of ordinary skill will recognize that the mount plates 26 and 29 can be mounted to the tailgate 14 in one of many ways, depending on the preference of the user.

Figure 7:
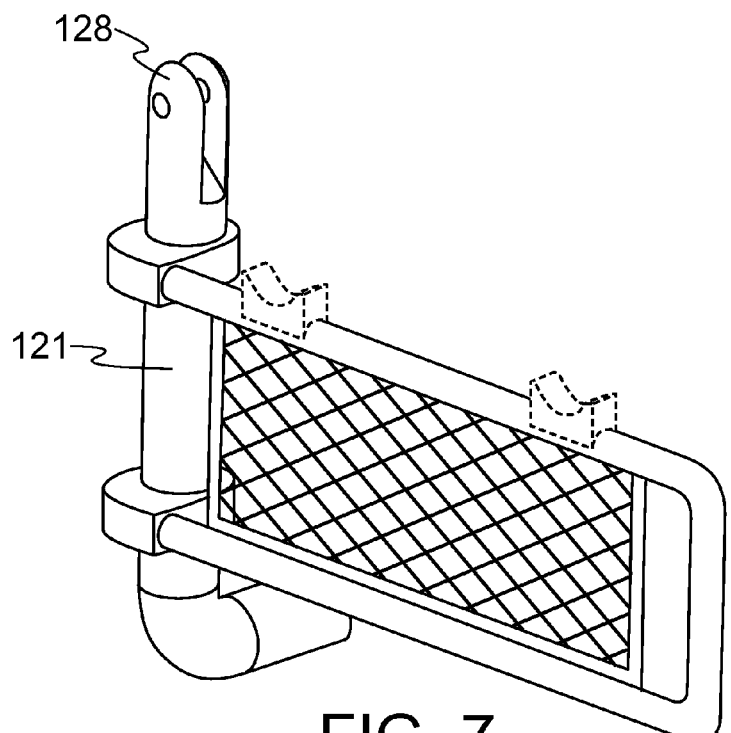
FIG. 7 is an exploded view illustrating an alternative embodiment of the present invention.

In an alternate embodiment, illustrated in FIG. 7, the frame side 121 can terminate into a hinge groove 128 that is pivotably mounted to a hinge spine (not shown) that is mounted to the mount plate (also not shown). This is essentially a reversal of the preferred embodiment.

Figure 2:
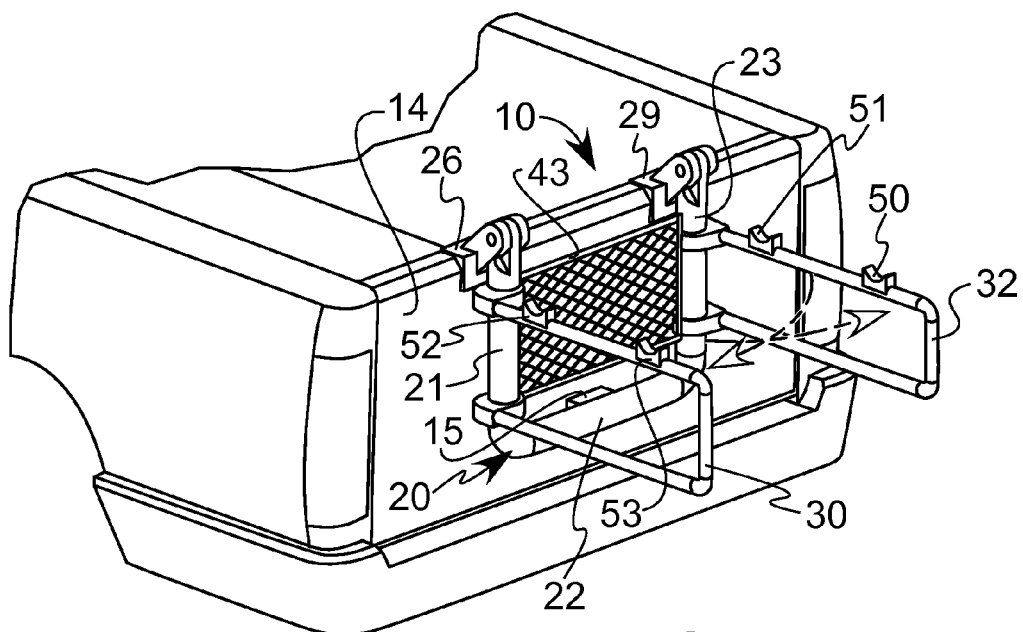
FIG. 2 is a perspective view illustrating the embodiment of FIG. 1A in a bicycle carrying operation.

The first method for using the apparatus 10 is as a bicycle rack. The frame 20 begins in a resting orientation mounted to the tailgate and seated against and parallel to the tailgate's exterior as in FIG. 1A. The arms 30 and 32 are also parallel to the tailgate to give the apparatus a low profile. The user rotates each of the arms 30 and 32 approximately 90° relative to the frame 20 so that the arms 30 and 32 are substantially perpendicular to the frame 20 as shown in FIG. 2. In the preferred embodiment, four brackets 50, 51, 52 and 53 are mounted to the arms 30 and 32 for aiding in the receipt of the bicycle. Finally, the user mounts a bicycle onto the brackets of the arms for storage or transport, such as by extending the arms through the bicycle's frame as a conventional bicycle rack is used.

The brackets 50, 51, 52 and 53 used in the preferred embodiment are made from a durable plastic or non-marking rubber material that will not scratch the bicycle or the arms of the apparatus 10. The brackets 50, 51, 52 and 53 have a U-shaped opening on the top for the bicycle to rest in and a groove on the bottom for mounting to the arms. Preferably the brackets fit tightly around the arms so that no additional hardware is needed to mount the brackets to the arms. The brackets 50, 51, 52 and 53 can be mounted to the arms in many ways including by using screws, bolts, or clamps, and can be permanently or removably mounted.

Figure 3:
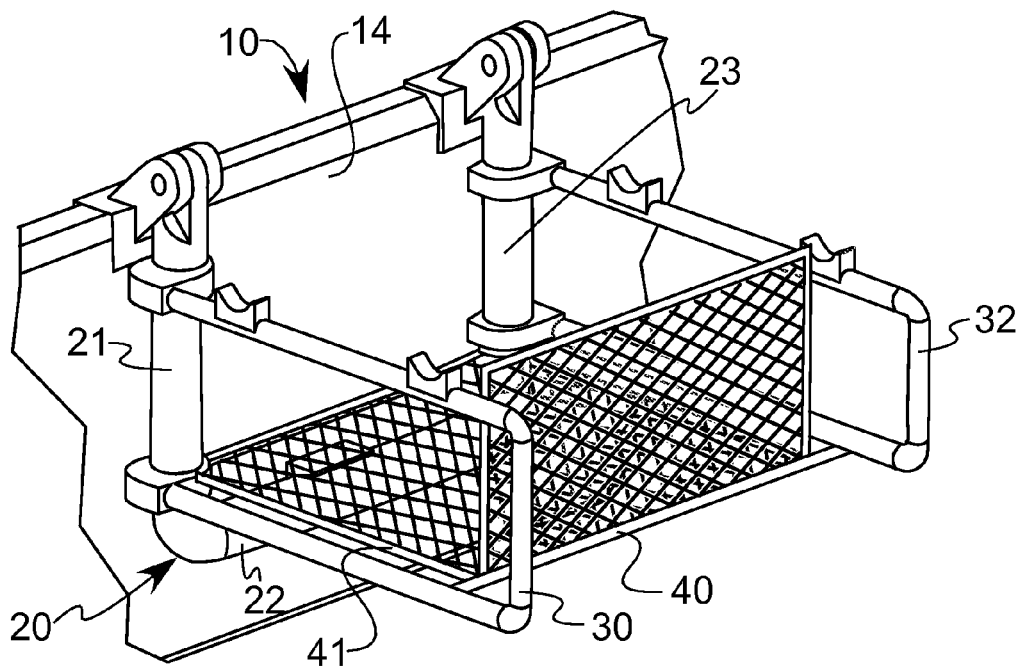
FIG. 3 is a perspective view illustrating the embodiment of FIG. 1A in a container operation.
Figure 4:
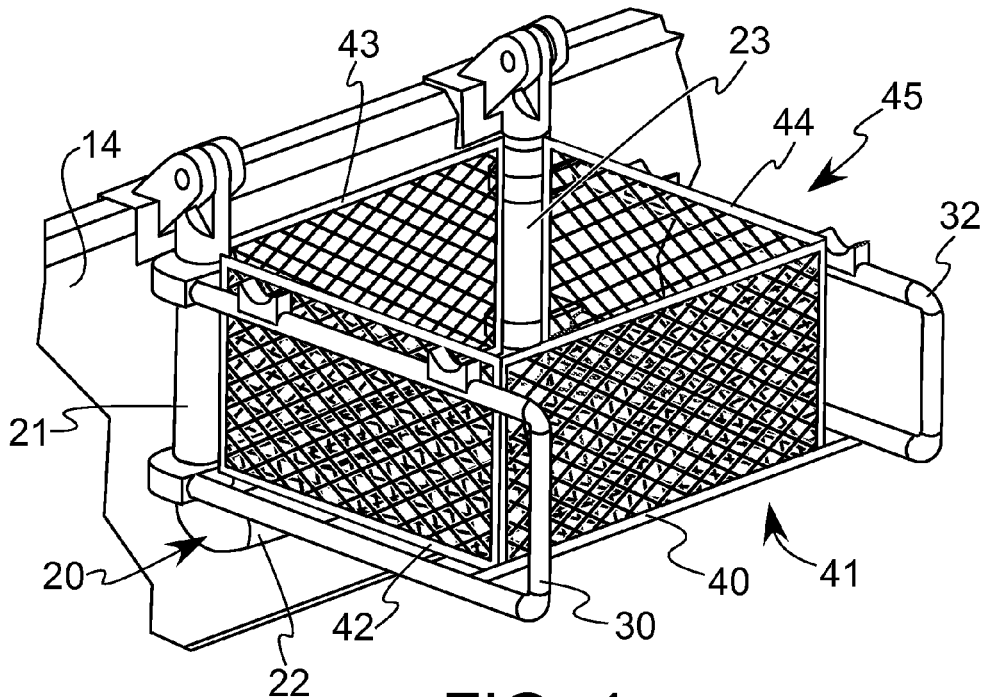
FIG. 4 is a perspective view illustrating the embodiment of FIG. 1A in a basket operation.

The second configuration for using the apparatus is as a basket, as illustrated in FIGS. 3 and 4. The arms 30 and 32 are extended as in FIG. 2, which is the "bicycle rack" configuration described above. Two panels 40 and 41 are removably mounted to the arms 30 and 32 to begin arranging the invention in the second configuration. The first panel 40 is mounted to the ends of the arms 30 and 32, opposite the frame 20, such as by screws or cooperating fasteners. The second panel 41 is mounted to an underside of the arms 30 and 32, as illustrated in FIG. 3 by similar fasteners. In this configuration, a large object, such as a gasoline can, can be placed within the panels 40 and 41 for storage, but remains outside the vehicle body. This may be advantageous if the cargo is dirty or could leak.

In addition, as illustrated in FIG. 4, a plurality of other panels can be mounted to the arms 30 and 32, forming an even more enclosed basket 45. The user mounts the panel 43 to the frame 20 near the tailgate 14 and opposite the panel 40. The panel 44 is mounted to the arm 32 to the upper and lower legs of the U-shaped members, and the panel 42 is similarly mounted to the arm 30 to complete the basket. The panels can be mounted to the arms in any order, and it is the user's discretion whether to use all of the panels or only a select few. A person of ordinary skill will recognize that any number of panels may be used in this configuration depending upon the size of the object being stored. The user then inserts an object, such as a toolbox, into the basket for storage. A final panel or lid (not shown) could be placed on the top of the basket.

The panels 40, 41, 42, 43 and 44 used in the preferred embodiment are made of metal screen to permit gases and liquids to easily pass through. However, the panels can be made of any variety of materials including wood, aluminum or plastic. Further, the panels can be solid or have more or fewer, smaller or larger openings. The panels 40, 41, 42, 43 and 44 are preferably mounted to the arms using removable fasteners and can be mounted in a variety of ways as will be recognized by a person having ordinary skill.

Figure 5:
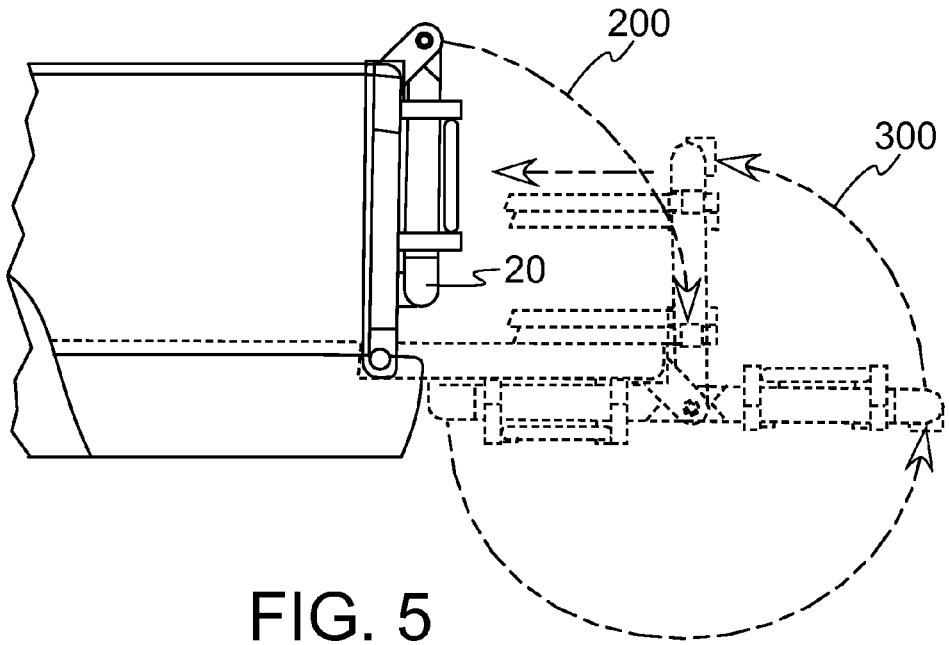
FIG. 5 is a side view illustrating the embodiment of FIG. 1A.
Figure 6:
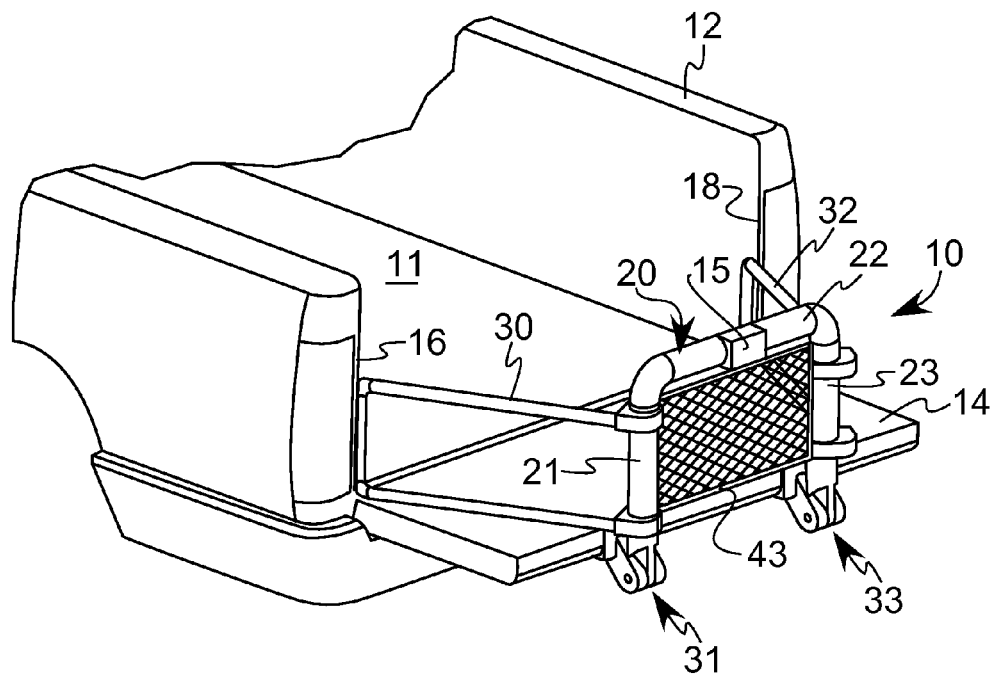
FIG. 6 is a perspective view illustrating the embodiment of FIG. 1A in cargo bed extender operation.

The third configuration of the apparatus 10 is as a cargo bed extender, and this is illustrated in FIGS. 5 and 6. Once the apparatus 10 is mounted to the tailgate 14 and is in the resting position, illustrated in FIG. 1A, the user drops the tailgate 14 to a substantially horizontal position, as shown by the arrow 200 in FIG. 5. The frame 20 is then rotated about the hinges 31 and 33 approximately 270° relative to the tailgate 14 to a substantially perpendicular position relative to the tailgate 14, as illustrated by the arrow 300 in FIG. 5. The user then extends the arms 30 and 32 at least about 90° from the frame 20 to the rear lateral edges 16 and 18 of the vehicle 12 as shown in FIG. 6. The apparatus 10 configured in this manner serves as a cargo bed extender that enables the user to secure an object within the bed even if it has dimensions that exceed the dimensions of the cargo bed 11 of the vehicle 12. Long objects, such as boards or PVC piping, can be placed within the vehicle's cargo bed and be contained by the apparatus 10.

As will be recognized by a person having ordinary skill, the frame of the invention can be rotated about hinges more than 270°, depending upon the configuration of the hinges. Rotating the frame more than 270° will enable the user to use the frame, as it seats against the interior of the tailgate, inside the cargo bed for a variety of purposes, if desired.

The preferred embodiment of the present invention is advantageous because the user can configure the preferred embodiment to be used in a variety of situations. Not only is the apparatus capable of extending the cargo bed of a vehicle, but it can also be used as a bicycle rack and a storage basket; all while being mounted to the tailgate of the vehicle, and without occupying any cargo space.

Furthermore, the ability of the apparatus to rotate from the exterior of the tailgate approximately 270° to be substantially perpendicular to the tailgate to create the extra space in the cargo bed is a space-saving feature. The preferred embodiment is stored or functions in the resting position while attached to the tailgate, not encroaching on the cargo space of the vehicle.

While certain preferred embodiments of the present invention have been disclosed in detail, it is to be understood that various modifications may be adopted without departing from the spirit of the invention or scope of the following claims.

The invention claimed is:

1. An apparatus for use with a vehicle having a cargo bed, the cargo bed having a tailgate with a rear surface that faces away from a front of the vehicle when the tailgate is in an upright, closed position and an opposite, front surface, the apparatus comprising:
   (a) a frame hingedly mounted to the tailgate with at least about 270° of rotation relative to the tailgate between a first position outside of the cargo bed and immediately adjacent and parallel to the rear surface of the tailgate when the tailgate is in the closed position and a second position immediately adjacent and transverse to the front surface of the tailgate;
   (b) first and second arms pivotably mounted on opposite sides of the frame with at least about 90° of rotation relative to the frame from a resting position in which the arms are substantially parallel to the frame, to an extended position; and
   (c) a first panel removably mounted to an underside of each of the arms in the extended position, the first panel for supporting an object when the frame is in the first position.

2. The apparatus in accordance with claim 1, further comprising a second panel removably mounted between the arms when the arms are extended, the second panel being mounted to ends of the arms that are opposite the frame.

3. The apparatus in accordance with claim 2, further comprising a third panel removably mounted to the frame, a fourth panel removably mounted to one of said arms and a fifth panel removably mounted to another of said arms, said panels forming a basket in which objects can rest.

4. The apparatus in accordance with claim 1, wherein said tailgate is extended to a substantially horizontal position, the frame is substantially perpendicular to the tailgate and the arms extend horizontally from the frame to rear lateral edges of the vehicle for containing an object.

5. The apparatus in accordance with claim 1, wherein the frame is substantially parallel to the tailgate and the arms extend substantially perpendicularly from the frame for receiving an object.

6. An apparatus for use with a vehicle having a cargo bed, the cargo bed having a tailgate that seats against the vehicle's rear lateral edges, with a rear surface that faces away from a front of the vehicle when the tailgate is in an upright, closed position and an opposite, front surface, the apparatus comprising:
   (a) a frame hingedly mounted to the tailgate with at least about 270° of rotation relative to the tailgate between a first position outside of the cargo bed and immediately adjacent and parallel to the rear surface of the tailgate when the tailgate is in the closed position and a second position immediately adjacent and transverse to the front surface of the tailgate; and
   (b) first and second arms pivotably mounted on opposite sides of the frame with at least about 90° of rotation relative to the frame from a resting position, in which the arms are substantially parallel to the frame, to an extended position;
   (c) a first panel removably mounted to ends of the arms that, when extended, are opposite the frame; and
   (d) a second panel removably mounted to an underside of the arms in the extended position, the second panel for supporting an object when the frame is in the first position.

7. The apparatus in accordance with claim 6, wherein a first of said at least three sides terminates in a hinge spine and is pivotably mounted in a first hinge groove on a first mount plate and a second of said at least three sides terminates in a second hinge spine and is pivotably mounted to a second hinge groove on a second mount plate, thereby forming a pair of hinges on a pair of mount plates which are mounted to the tailgate.

8. The apparatus in accordance with claim 6, further comprising a third panel removably mounted to the frame, a fourth panel removably mounted to one of said arms and a fifth panel removably mounted to another of said arms, said panels forming a basket in which objects can rest.

9. The apparatus in accordance with claim 6, wherein said tailgate is extended to a substantially horizontal position, the frame is substantially perpendicular to the tailgate and the arms extend horizontally from the frame to the rear lateral edges of the vehicle for containing an object.

10. The apparatus in accordance with claim 6, wherein the frame is substantially parallel to the tailgate and the arms extend substantially perpendicularly from the frame for receiving an object.

11. The apparatus in accordance with claim 10, further comprising at least one pair of removable brackets mounted to the arms upon which a bicycle can be supported.

\* \* \* \* \*